April 8, 1952     K. L. WOODMAN     2,592,503

MANUFACTURE OF STEAM IRONS

Filed Jan. 7, 1948

INVENTOR
KENNETH L. WOODMAN.

BY *R.J. Eisinger*
ATTORNEY

UNITED STATES PATENT OFFICE 2,592,503

MANUFACTURE OF STEAM IRONS

Kenneth L. Woodman, Mansfield, Ohio, assignor to Westinghouse Electric Corporation, East Pittsburgh, Pa., a corporation of Pennsylvania Application January 7, 1948, Serial No. 1,016

8 Claims. (Cl. 154—116)

This invention relates to pressing irons of the type providing steam for moistening material being pressed and has for its object to provide an improved iron of this type.

The steam-generating chamber and related steam passages leading to outlet ports in the soleplate of a steam iron are usually joined to a cover plate with a gasket to insure leakproof joints. The gasket may be eliminated or further improved by using a sealing layer of silicone compound between the mating surfaces of the steam chamber and steam passages and their cover plate. Also, the surfaces of the steam-generating chamber may be coated with a wetting agent such as sodium silicate, as taught by Eldred O. Morton, in his copending patent application, Serial No. 58,520, filed November 5, 1948, its purpose being to allow incoming water to the steam chamber to wet the treated surfaces and spread rapidly, thus accelerating vaporaization and minimizing the possibility of partially vaporized water being emitted from the soleplate.

Mr. Morton's invention works very well with ordinary gasket materials and achieves the desired results. However, when used in an iron having a silicone compound seal, the curing of the silicone compound counteracts the desired property of the wetting agent. A vapor is given off by the silicone compound during its curing which contaminates or deposits a thin non-wettable film over the perviously applied wetting agent.

It is an object of this invention to provide a simple, inexpensive and readily removable means for protecting the wetting properties of a surface which are subject to destruction by vapors given off during the heat-curing process of a silicone compound seal used in the manufacture of a steam iron.

It is a further object of this invention to provide a protective coating for a surface whose wetting properties are subject to impairment by the vapors given off during the heat-curing process of a silicone compound seal used in the manufacture of a steam iron, said coating being removable by the "self-heat" of the iron.

I have found that it is possible to overcome the above mentioned difficulty by applying a coating of a protective material over the surface of the wetting agent. This protective coating has the property of being removable by heat at a temperature in excess of the curing temperature of the silicone compound. The silicone is cured by energizing the iron to a temperature of approximately 375° F. At the end of its curing cycle the emissions from the silicone will cease. The iron is then heated to a higher temperature, whereby the protective coating will be driven off, carrying off with it those products originally emitted by the silicone and exposing the surface of the wetting agent undamaged and unaltered.

There are a number of such protective coatings which may be used, such as cellulose nitrate, polystyrene, polymethylmethacrylate, polyethylene, polyisobutylene, cycloparaffin resin, cyclopentadiene resin, coumarone-indene resin and polyvinylisobutyl ether. These resins all have the property of depolymerizing or decomposing or both with substantially no residue left when subject to temperature of over 400° F. for a brief period of time. They leave no carbon residue in particular which would be objectionable. These materials may be prepared in liquid form by dissolving in any of the usual aromatic solvents, as for example, toluene, except for cellulose nitrate which is soluble in alcohol-ether mixtures. Cellulose nitrate may also be used by dissolving in a mixture of diethyl carbonate and diethyl oxalate. Although any of the above materials may be used, I prefer to use cellulose nitrate, since it is readily applied with a brush, dries rapidly and is readily driven off by heat within the maximum temperature range of the iron. For these reasons it readily lends itself to mass production methods, can be applied on a moving production line and driven off by energizing the soleplate of the iron. I have found that a solution of cellulose nitrate having the following proportions is quite satisfactory:

| | Grams |
|---|---|
| Cellulose nitrate | 20 |
| Diethyl carbonate | 715 |
| Diethyl oxalate | 265 |

The above proportions are not critical and may be varied to obtain any desired consistency.

My invention, therefore, provides a readily removable protective coating for a surface treated with a wetting agent, which is subject to destruction of its wetting property by products given off during the curing process of a silicone compound used in the manufacture of the steam iron.

The protective coating is readily removable by heating to a temperature which is higher than the curing temperature of the silicone, but which is within the maximum temperature range of the iron, thereby permitting such removal by the "self-heat" of the iron.

In the accompanying drawings used for illustration purposes:

Figure 1:
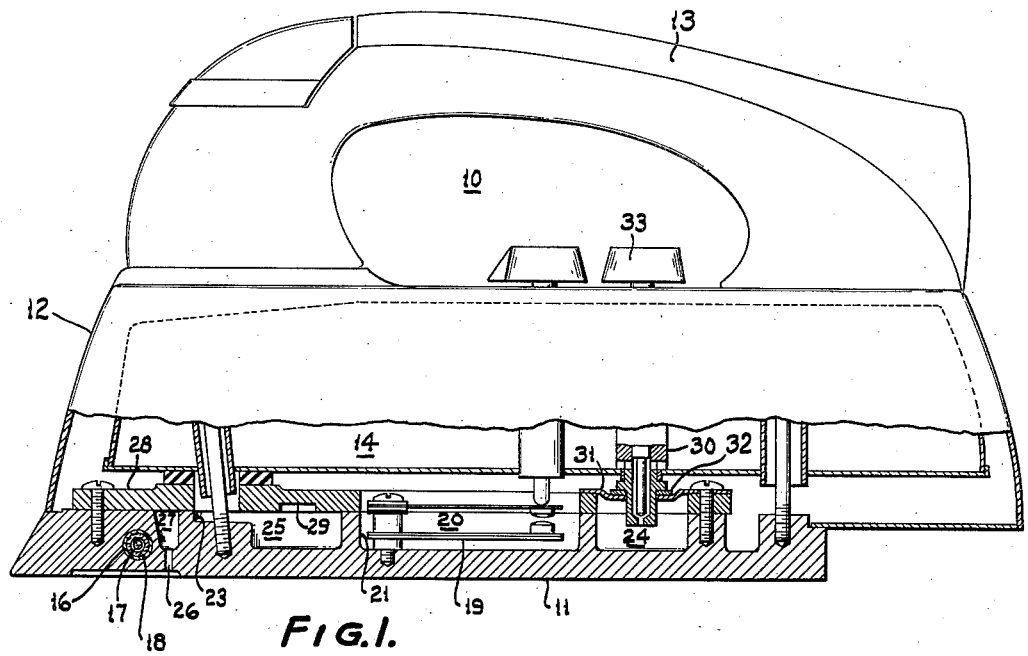
Fig. 1 is a side elevation of an electric steam iron partially in section.
Figure 2:
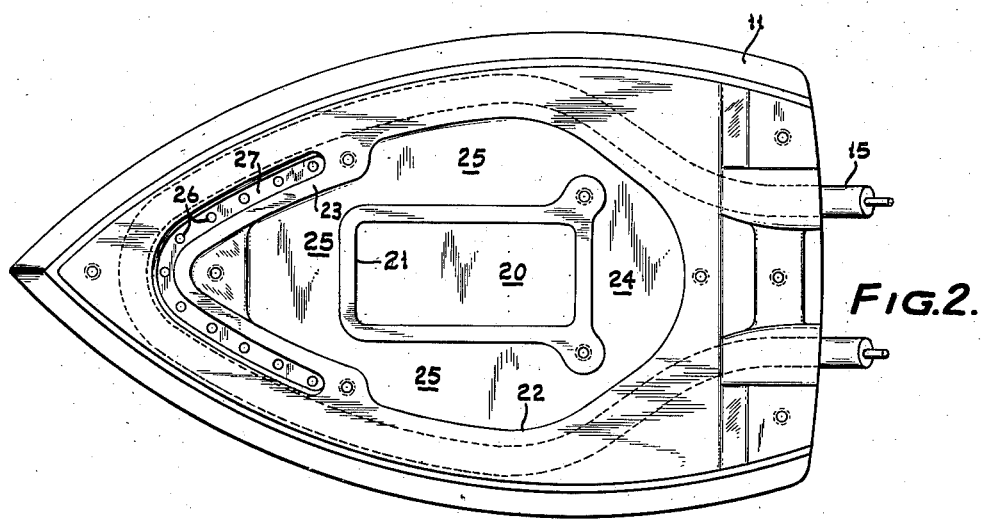
Fig. 2 is a top plan view of the soleplate.

As shown in the above drawing, a steam iron generally indicated 10, is electrically heated and comprises a metallic soleplate 11, a sheet metal cover or shell member 12 and a plastic or wood handle 13 which are fastened together in any suitable manner. The cover houses a water-storage chamber or reservoir 14. The soleplate may be of conventional shape as illustrated in Fig. 2, and is provided with a heating element 15 which is generally U-shaped as shown by the dotted lines in Fig. 2. The heating element is preferably cast into the soleplate, and may be of the sheathed type containing an outer tube or sheath 16 housing a coiled resistance element 17 centrally disposed and spaced from the outer sheath by a highly compacted refractory insulating material 18.

A thermostat 19 is centrally positioned in the soleplate 11 in a well 20 which is defined by a wall 21 preferably formed integrally with the soleplate.

The wall 21 together with an outer wall 22 and a V-shaped rib 23 define a steam-generating chamber 24 and passages 25. A plurality of outlet ports 26 lie in a V-shaped channel 27 adjacent to the V-shaped rib 23 and are shielded from direct communication with passages 25 by the rib. A cover plate 28 is secured to the soleplate 11 by any suitable means and serves to enclose the steam chamber 24, the passages 25 and the outlet ports 26, thus preventing escape of steam except through the outlet ports in the soleplate. This cover plate has a transverse channel 29 which serves as a connecting passage between passages 25 and the V-shaped channel 27. The steam is thus allowed to flow from the steam chamber 24 through passages 25 to channel 29, through the channel into the V-shaped channel 27, and from the V-shaped channel through the outlet ports 26 to the bottom of the soleplate.

The water reservoir 14 has a needle valve 30 by means of which it communicates with the steam chamber 24. This valve registers with an opening in a plate 31 which overlies an opening in the cover plate 28 and is fastened thereto. The valve and the plate 31 are maintained in leakproof contact by an annular gasket 32. In order to reduce the conductivity from the cover plate to the water reservoir 14, this plate is preferably constructed of light gauge material.

An adjustment knob 33 serves to adjust the valve 30 in order to vary the entry of water into the steam chamber and thus controls the rate of steam generation.

The confining surfaces of the steam chamber 24 and the passages 25 are coated with a wetting agent, preferably a solution of sodium silicate, in their preassembly stage. To insure that these confining surfaces are fully coated when the parts are assembled, it is expedient to coat the entire bottom and edge surfaces of the cover plate 28, the bottom surface of plate 31, and the upper and edge surfaces of the soleplate 11. The surface of the well 20 need not be coated, since it is sealed against steam or water access. The coated parts are then air dried.

The valve 30 may also be treated with a wetting agent, by preparing a dilute solution and introducing it to the valve by means of the reservoir 14. This solution is allowed to drip through the valve, thus depositing a thin coating on the valve parts.

After the treated parts are dry they are then coated with a protective material. This coating may be applied in any well-known manner, such as by brushing or spraying. Since this coating is used to protect the wetting surfaces it must be understood that all the surfaces coated with the sodium silicate solution are also coated with the protective material. The coated parts are then again air dried.

I prefer to use a cellulose nitrate protective coating although as previously stated there are a number of protective coatings which may be used, such as polystyrene, polymethylmethacrylate, polyethylene polyisobutylene, cycloparaffin resin, cyclopentadiene resin, coumarone-indene resin and polyvinylisobutyl ether. These materials may be prepared in liquid form by the use of any of the usual aromatic solvents, as for example, toluene. The cellulose nitrate may be prepared in liquid form by dissolving in a mixture of diethyl carbonate and diethyl oxalate, the following proportions having been found satisfactory:

| | Grams |
|---|---|
| Cellulose nitrate | 20 |
| Diethyl carbonate | 715 |
| Diethyl oxalate | 265 |

The above proportions may be varied to obtain any desired consistency and are not critical.

As explained earlier in this specification, the soleplate 11 and the cover plate 28 are fastened together to close the steam chamber 24, the steam passages 25 and the V-shaped channel 27. Before fastening together, the mating surfaces, that is, the top surfaces of the thermostat well wall 21, the outer soleplate edge 22 and the V-shaped rib 23 of the soleplate, and the corresponding bottom surface of the cover plate are coated with a silicone cement. The cover plate is then fastened to the soleplate by any suitable means and the silicone is then cured by energizing the soleplate heating element 15 to produce an operating temperature of approximately 375° F. During this curing operation, the silicone cement will gixe off vapors which will coat the surface of the protective coating covering the sodium silicate. At the end of the curing cycle, the temperature of the iron is raised sufficiently to drive off the coating covering the sodium silicate. If cellulose nitrate is used, a temperature of approximately 500° F., well within the operating temperature of the iron, is sufficient to remove the protective coating. When the protective coating is driven off, the vapors carry off the residual vapors deposited by the silicone cement which have non-wettable properties. The sodium silicate surface is now exposed in its original state leaving the wettable characteristics of the steam chamber surfaces unharmed.

While I have shown my invention in but one form, it will be obvious to those skilled in the art that it is not so limited, but is susceptible of various changes and modifications without departing from the spirit thereof.

What I claim is:

1. In the manufacture of a steam iron comprising a vapor-generating chamber formed by parts having mating surfaces and a layer of a silicone compound therebetween adapted to be heat-cured to provide a leakproof seal; the method of protecting the wetting properties of at least a portion of the surface of said vapor-generating chamber from contamination by emissions from said silicone compound during its heat-curing process which comprises coating said surface with a protective material which is removable by heat at a temperature higher than necessary for heat-curing said silicon compound, heating the iron to the temperature necessary for curing said compound and then removing said protective material by subjecting it to said higher temperature at which such removal is effected.

2. In the manufacture of a steam iron comprising a vapor-generating chamber formed by parts having mating surfaces and a layer of a silicone compound therebetween adapted to be heat-cured to provide a leakproof seal, said chamber having at least a portion of its surface coated with a wetting agent; the method of protecting the wetting properties of said wetting agent from contamination by emissions from said silicone compound during its heat-curing process which comprises coating said wetting agent with a protective material which is removable by heat at a temperature higher than necessary for heat-curing said silicone compound, heating the iron to the temperature necessary for curing said compound and then driving off said protective material by subjecting it to said higher temperature.

3. In the manufacture of a steam iron comprising a vapor-generating chamber formed by parts having mating surfaces and a layer of a silicone compound therebetween adapted to be heat-cured to provide a leakproof seal; the method of protecting the wetting properties of at least a portion of the surface of said chamber from contamination by emissions from said silicone compound during its heat-curing process which comprises coating said surface with a protective material which is removable by heat at a higher temperature than necessary for heat-curing said silicone compound.

4. In the manufacture of a steam iron comprising a heating element and a vapor-generating chamber formed by parts having mating surfaces and a layer of a silicone compound therebetween adapted to be heat-cured to provide a leakproof seal, said chamber having at least a portion of its surface coated with a wetting agent; the method of protecting the wetting properties of said wetting agent from contamination by emissions from said silicone compound during its heat-curing process, which comprises coating said wetting agent with a protective material which is removable by heat at a higher temperature than necessary for curing said silicone compound, but within the maximum operating temperature of the iron attainable by energizing the heating element.

5. The method set forth in claim 4 which further includes curing said compound by energizing the heating element sufficiently to heat the iron to the temperature necessary for effecting such curing, and then eliminating said protective material by further energizing the heating element to heat the iron to the higher temperature necessary for effecting such elimination.

6. In the manufacture of a steam iron comprising a vapor-generating chamber formed by parts having mating surfaces and a layer of a silicone compound therebetween adapted to be heat-cured to provide a leakproof seal; the method of protecting the wetting properties of at least a portion of the surface of said chamber from contamination by emissions from said silicone compound during its heat-curing process which comprises coating said surface with cellulose nitrate.

7. In the manufacture of a steam iron comprising a vapor-generating chamber formed by parts having mating surfaces and a layer of a silicone compound therebetween adapted to be heat-cured to provide a leakproof seal; the method of protecting the wetting properties of at least a portion of the surface of said vapor-generating chamber from contamination by emissions from said silicone compound during its heat-curing process which comprises coating said surface with cellulose nitrate, heating the iron to the temperature necessary for curing said compound and then removing said cellulose nitrate by subjecting it to a sufficiently higher temperature.

8. In the manufacture of a steam iron comprising a vapor-generating chamber formed by parts having mating surfaces and a layer of a silicone compound therebetween adapted to be heat-cured to provide a leakproof seal, said chamber having at least a portion of its surface coated with a wetting agent; the method of protecting the wetting properties of said wetting agent from contamination by emissions from said silicone compound during its heat-curing process which comprises coating said wetting agent with cellulose nitrate, heating the iron to the temperature necessary for curing said compound and then driving off said cellulose nitrate by subjecting it to a sufficiently higher temperature.

KENNETH L. WOODMAN.

REFERENCES CITED

The following references are of record in the file of this patent:

UNITED STATES PATENTS

| Number | Name | Date |
| --- | --- | --- |
| 1,159,820 | Armstrong | Nov. 9, 1915 |
| 1,550,629 | Paulus | Aug. 18, 1925 |
| 2,446,922 | Grundner | Aug. 10, 1948 |

OTHER REFERENCES

Larsen: Modern Plastics, vol. 23, No. 7, March 1946, pp. 160–162 and 192 to 194.